United States Patent [19]
Garner

[11] 3,733,156
[45] May 15, 1973

[54] INJECTION MOULDING MACHINES
[75] Inventor: Paul Johnson Garner, Welwyn Garden City, England
[73] Assignee: Imperial Chemical Industries Limited, Millbank, London, England
[22] Filed: Apr. 12, 1971
[21] Appl. No.: 132,971

Related U.S. Application Data
[62] Division of Ser. No. 781,763, Dec. 6, 1968, Pat. No. 3,599,290.

[52] U.S. Cl. ............425/132, 425/129, 425/245, 425/257
[51] Int. Cl. ..........................................B29f 1/022
[58] Field of Search ..........18/30 AA, 30 R, 30 UM, 18/13 C, 13 P, 13 N, 13 R; 137/605, 625.41; 425/113, 114, 251, 257, 132, 129, 130, 245; 264/245, 328

[56] References Cited

UNITED STATES PATENTS

| | | |
|---|---|---|
| 97,366 | 11/1969 | Dodge....................137/625.41 |
| 264,573 | 9/1882 | Seabury..................137/625.41 |
| 1,671,405 | 5/1928 | Clark...................137/625.41 X |
| 2,443,554 | 6/1948 | Mattia...................18/30 AA X |
| 2,674,007 | 4/1954 | Allemann et al. ...........18/13 RR |
| 3,530,889 | 9/1970 | Spencer.................137/625.41 X |
| 2,174,779 | 10/1939 | Delorme....................264/245 X |
| 3,417,433 | 12/1968 | Terooka.......................425/251 |

Primary Examiner—Robert L. Spicer, Jr.
Attorney—Cushman, Darby & Cushman

[57] ABSTRACT

There is provided apparatus for moulding laminar articles. Two screw-injection barrels are arranged to sequentially pass resinous materials through a valve, in the fixed platen of an injection moulding machine or in the walls of the mould cavity, in a single sprue into the mould cavity. Control means are provided to control the valve so that material from one screw-injection barrel does not pass while material flows from the other screw-injection barrel. The control means is synchronized so that the desired quantities of materials from two injection barrels are placed in the mould cavity.

Figure 3:
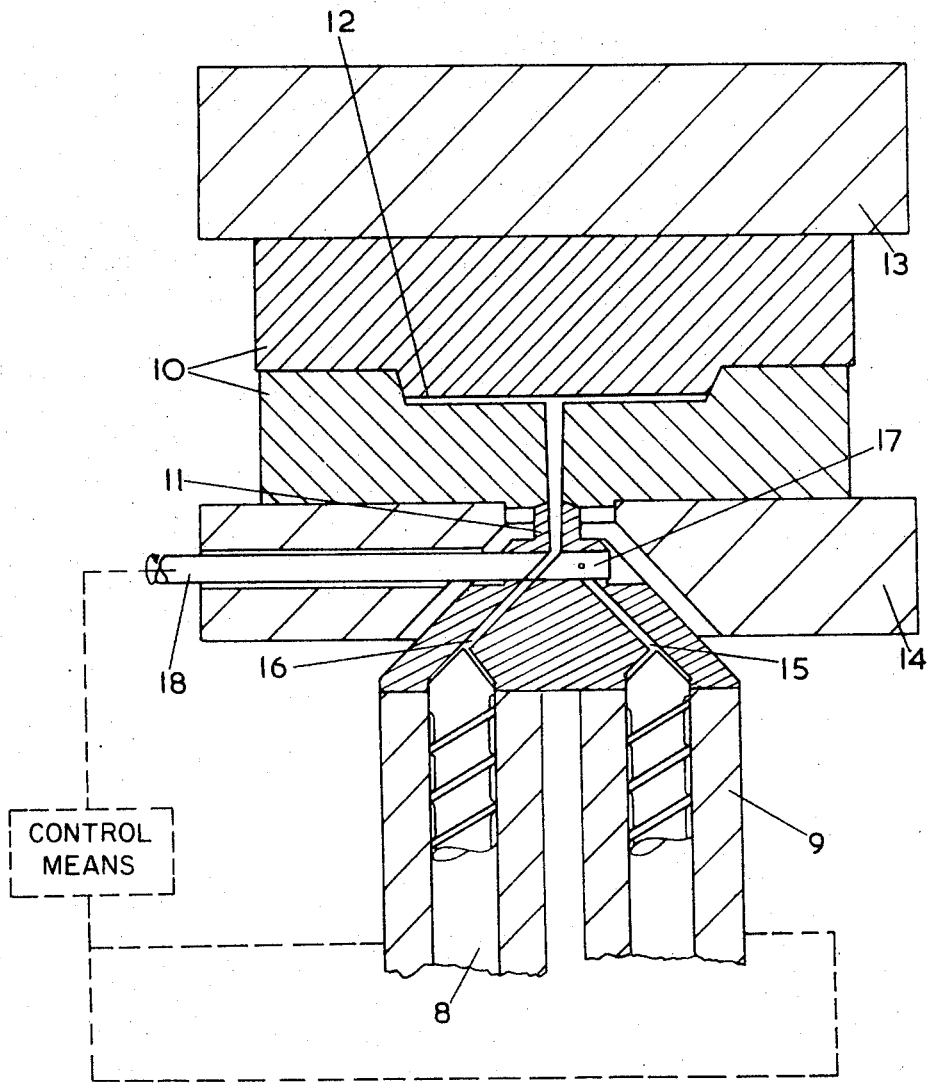

8 Claims, 3 Drawing Figures 3,733,156

INVENTOR
PAUL JOHNSON GARNER

BY Cushman, Darby & Cushman
ATTORNEYS ical application of copending application Ser. No. 781,763 filed Dec. 6 1968 now U.S. Pat. No. 3,599,290 and entitled "Injection Moulding Machines".

The present invention relates to improvements in or relating to injection moulding machines.

It has been proposed to produce a laminar articles by the sequential injection of two materials into a mould. If, however, it is necessary to produce an injection moulded article having a core of a certain material and surface layers of a different material, mixing of the two materials may be reduced if they are injected sequentially from one port into the mould. In this way the material forming the surface layers of the article is the first to be injected in to the mould and is then forced to the extremities of the mould by the pressure due to the injection of the core forming material thus ensuring that the surface layer material does in fact provide the whole of the surface. To ensure that there is a sharp distinction between the two materials it is desirable that they should be prevented from mixing before they are injected into the mould.

According to the present invention we provide in an injection moulding machine for thermoplastic materials in which material is introduced to the mould from at least two separate sources along a single sprue a valve adapted to permit only material from one of said sources to enter said sprue at any one instance of time and that only allows the total amount of material required from that sprue in the production of one moulding to pass therethrough during one moulding cycle.

Throughout the present specification and claims the term "sprue" is used to describe the channel connecting the valve to the mould cavity.

The present invention is particularly, but not exclusively, applicable to the production of articles having a foamed core and unfoamed surface layers. These articles may be produced by first injecting an unfoamable thermoplastic composition into the mould and subsequently injecting a foamable composition, which is then allowed to foam in the mould. The unfoamable composition thus provides the unfoamed surface skin of the article. Conveniently these articles may be made in an injection moulding machine having two injection barrels both of which introduce thermoplastic material into a single sprue from whence the material is injected into the mold. Thus, using an injection moulding machine according to the present invention the valve is first opened to the source of unfoamable material and the desired amount of unfoamable material introduced into the sprue and mould cavity; the valve is then closed to the unfoamable material and opened to the source of foamable material and the required amount of foamable material allowed to pass through the valve and into the mould. The foamable material is then allowed to foam within the mould; this foaming may be permitted by injecting only an amount of material into the mould so that the mould will be filled when foaming has taken place. Alternatively the mould cavity may be enlarged subsequent to the injection to provide room for the foamable material to expand. The mould may be enlarged mechanically or by the pressure generated by the decomposition of the blowing agent as is convenient. The valve should be closed to all the sources of material after the required amounts of material have been injected into the sprue and the mould to prevent further material from dribbling from the sources into the sprue and to prevent material being forced back through the valve due to the pressures generated by the foaming of the foamable material within the mould.

In a preferred method of operating a machine according to the present invention which is especially useful in the production of laminar articles having a foamed core with unfoamed surface skins a second charge of unfoamable composition is allowed to pass through the valve after the charge of the foamable composition. This second charge of unfoamable material may be derived from a third source of material or, as is preferred, it may come from the same source as the original charge of unfoamable material. The first of these alternatives involves the use of a three-way valve whereas the second technique involves a second switching of the two-way valve. The purpose of introducing a second charge of unfoamable material is twofold. Firstly, although most of the material in the sprue is removed with the moulding, there is generally some left in the sprue and the second charge of unfoamable material ensures that any material that remains in the sprue when the moulding is removed from the mould is unfoamable material. This is desirable because if there is some foamable material remaining in the sprue this will become part of the first charge of material used in the next moulding cycle and the presence of blowing agent in this first charge will tend to mar the surface finish of the article produced. The second purpose is that it ensures that, when the material that was in the sprue during moulding and is attached to the moulding when it is removed from the mould is cut away from the moulding, an unfoamed and not a foamed area is exposed.

The valve provided by the present invention may conveniently comprise a tap provided with a bore corresponding to each source of material, each bore being adapted to permit material to flow from one of the source of material into the sprue, the bores being so disposed in the tap that while material may flow from one source into the sprue, material is prevented from flowing from the other sources. Then, by switching the tap, material is permitted to flow from another source while being prevented from flowing from any of the others, the preferred form of valve may also be shut off from all the sources of material to prevent material from dribbling through the valve due to thermal expansion of material in the sources. Furthermore, once the valve has been shut off after the introduction of the materials the screw of the moulding machine may be retracted ready for the next moulding cycle and it is not necessary to wait until moulding has been completed. This therefore means that the process may be operated more quickly. The bores of the tap may conveniently be brought into and out of register with the sources of material and into the shut-off position either by rotation or reciprocation of the tap. Our preferred moulding machines contain two sources of material which are preferably barrels of injection moulding machines and the channels from these sources should preferably enter the valve separately and emerge from the valve along a single channelled sprue. If the channels join after they have emerged from the valve there is a risk that the materials in the two channels will be mixed. The valve may conveniently be formed in the barrel end cap of a moulding machine or may be formed in the fixed platen of the machine or in a block attached to the fixed platen or in the mould itself. In our preferred machine the valve is formed in the barrel end cap of a moulding machine consisting of two injection barrels which are preferably parallel to each other.

The present invention is applicable to the injection moulding of any thermoplastic materials. The materials from the separate sources may be the same thermoplastic or different as the case may be. Although the use of machines according to this invention has been described with particular reference to the injection moulding of articles having a foamed core and smooth surface layers, the invention is in no way limited to the production of such articles. For example, it may be used to produce articles comprising laminates of two different thermoplastic materials or two different colors of the same or different thermoplastic materials.

The moulding machines of the present invention may be of the type in which material is introduced to the mould through more than one sprue and in the operation of such machines the material from one or more of these sprues may be provided by the technique of the present invention. In this instance the total amount of material that is allowed to flow through the valve during one moulding cycle should be the amount that is required from that source in the final moulding and will not then be the quantity required to fill the mould. If, on the other hand, the only supply of material to the mould is along a sprue which is fed by more than one source of material according to the present invention, then the amount that is allowed to pass through the valve in one moulding cycle will be the amount required to produce the moulding. Whichever technique is used, we prefer that the valve is switched to allow no more material to pass therethrough once the required quantity has been introduced to the mould and sprue.

The timing of the operation of the machine according to the present invention must be synchronized so that the various operations involved take place at the correct time. Thus, firstly the mould is closed ready for the introduction of the moulding material; the valve is then opened to the first source of material and the required quantity injected through the valve into the sprue; the valve then switched and material from the next source injected and so on for each source. The valve may then be closed or switched again to a final source or back to the first source as is required. The valve is then closed, the pressure on the material in the mould from one of the sources, being maintained until the valve is closed. Finally, if necessary the mould is enlarged to allow any foaming to take place and the mould then opened and the moulding removed. The cycle may then be repeated.

Figure 1:
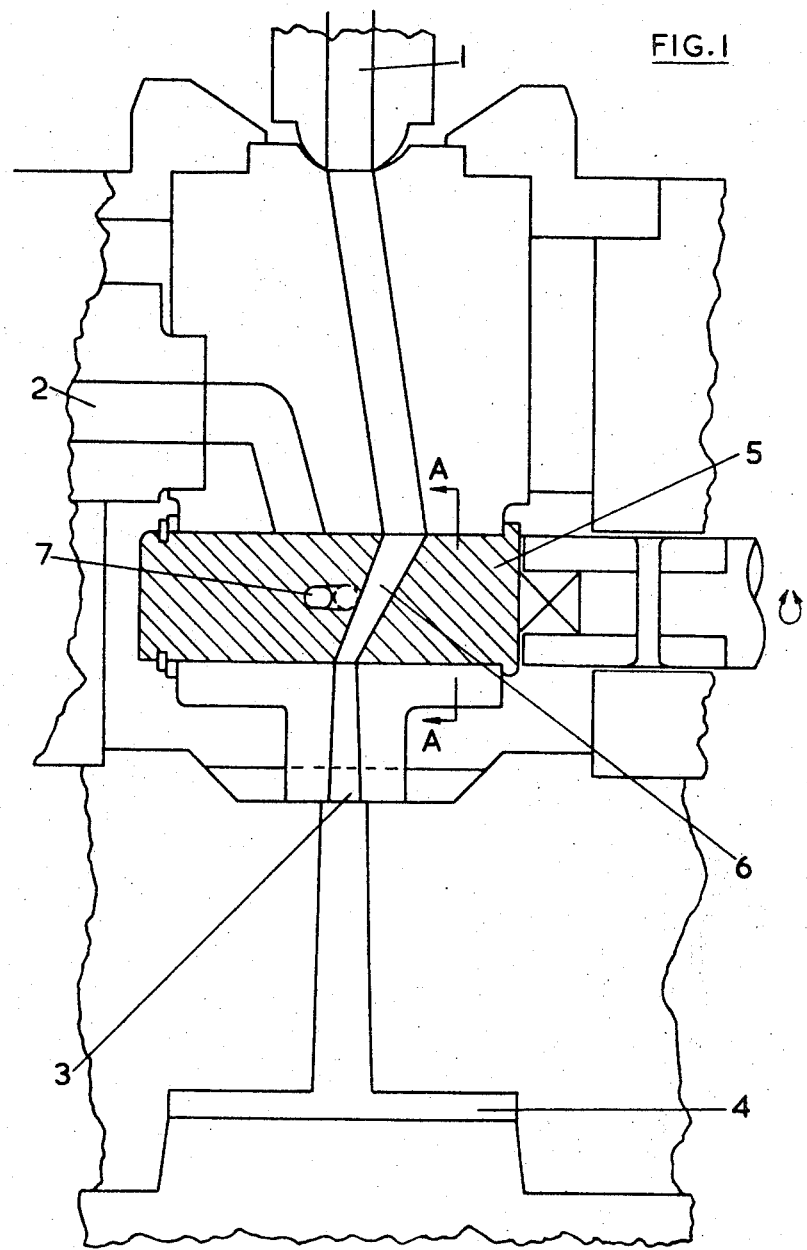
Figure 2:
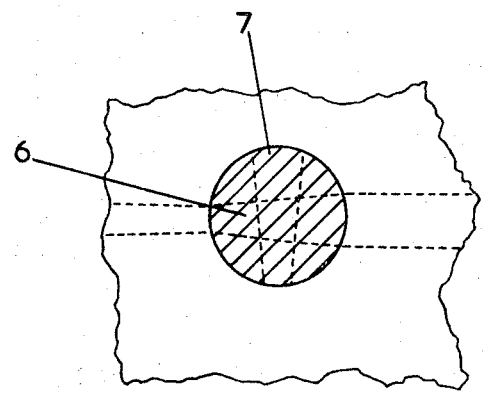

The present invention is illustrated but in no way limited by reference to the accompanying drawings in which:

FIG. 1 is a section through the part of an injection moulding machine containing a valve according to the present invention and FIG. 2 is a section taken on AA' of FIG. 1, and FIG. 3 is a section through the mould and barrels of another form of machine according to the present invention.

With reference to FIG. 1 the injection machine comprises two injection barrels 1 and 2 both of which deliver material into the sprue 3 and thence into the mould 4. The valve 5 is positioned in the paths of flow of the materials flowing from the two barrels; the valve is provided with two bores 6 and 7, the bore 6 being adapted to allow material to flow from barrel 1 through the valve into the sprue and the bore 7 being adapted to allow material to flow from barrel 2 through the valve into the sprue.

In operation of the machine illustrated in FIG. 1 the valve is set to allow material to flow from one of the barrels, barrel 1 as shown in FIG. 1, into the sprue and when the desired amount of material has flowed from barrel 1 the valve is rotated as shown by the arrow so that bore 6 is taken out of register with barrel 1 and bore 7 is brought into register with barrel 2. Materials may then flow from barrel 2 into the sprue and the whole charge, including the original material from barrel 1, injected into the mould.

FIG. 2 is a cross-section along A'–A of FIG. 1 and illustrates how the bores 6 and 7 are formed in the tap.

In the machine illustrated in FIG. 3 material is delivered to the mould from the barrels of two injection units 8 and 9 into the mould 10 along the sprue 11 to form the moulding illustrated by the shaded area 12. The mould 10 is located between the platens of the mould 13 and 14. The material flows from injection barrel 9 along channel 15 and from barrel 8 along channel 16. These two channels converge in the barrel end cap of the machine and meet at the selector valve 17; the valve 17 is provided with two bores each of which may be brought into register with one of the channels 15 and 16 to allow material to flow therefrom into the sprue 11 while preventing material from flowing from the other channel. The valve may be switched from one source to the other and into a shut-off position by rotation of the valve rod 18.

I claim:

1. An injection moulding machine for moulding laminar articles having an outer surface layer and at least one inner core layer of resinous material wherein at least two of the layers are composed of different resinous compositions, comprising a first screw-injection barrel operably connected through a sprue to a mould cavity for injecting a first resinous material through the sprue and into the mould cavity, at least one additional screw-injection barrel operably connected through said sprue to said mould cavity for injecting at least one additional resinous material which is different in composition from said first resinous material through said sprue and into said mould cavity, a valve means, formed in the fixed platen of the moulding machine, for passing the resinous material from said first and additional screw-injection barrels into said mould, said valve means being operably connected to said screw-injection barrels, control means for the valve means for controlling, in sequence, the passing of resinous material from said first screw-injection barrel into the sprue, then the passing of resinous material from said additional screw-injection barrel into the sprue and then for preventing resinous material from passing from any of said screw barrels into said sprue and for preventing any resinous material from passing back out of said mould into the sprue, and means for synchronizing the control means for said valve means during a moulding cycle, whereby a predetermined quantity of said first resinous material is injected into the mould and whereby a predetermined quantity of said additional resinous material is thereafter injected into the mould.

2. An injection moulding machine according to claim 1 in which the valve comprises a tap provided with channels, each of which is adapted to permit material to flow from one of the barrels into the sprue while the material is prevented from flowing from the other barrels into the sprue and by switching the tap material is then permitted to flow from another of said barrels into the sprue and which may be switched to prevent any material flowing into the sprue.

3. An injection moulding machine according to claim 1 in which there are only two separate screw-injection barrels.

4. An injection moulding machine according to claim 1 in which the barrels of the two injection moulding machines are aligned parallel to each other.

5. An injection moulding machine for moulding laminar articles having an outer surface layer and at least one inner core layer of resinous material wherein at least two of the layers are composed of different resinous compositions, comprising a first screw-injection barrel operably connected through a sprue to a mould cavity for injecting a first resinous material through the sprue and into the mould cavity, at least one additional screw-injection barrel operably connected through said sprue to said mould cavity for injecting at least one additional resinous material which is different in composition from said first resinous material through said sprue and into said mould cavity, a valve means, formed in the walls of the mould cavity, for passing the resinous material from said first and additional screw-injection barrels into said mould, said valve means being operably connected to the said screw-injection barrels, control means for the valve means for controlling, in sequence, the passing of resinous material from said first screw-injection barrel into the sprue, then the passing of resinous material from said additional screw-injection barrel into the sprue and then for preventing resinous material from passing from any of said screw barrels into said sprue and for preventing any resinous material from passing back out of said mould into the sprue, and means for synchronizing the control means for said valve means during a moulding cycle, whereby a predetermined quantity of said first resinous material is injected into the mould and whereby a predetermined quantity of said additional resinous material is thereafter injected into the mould.

6. An injection moulding machine according to claim 5 in which the valve comprises a tap provided with channels, each of which is adapted to permit material to flow from one of the barrels into the sprue while the material is prevented from flowing from the other barrels into the sprue and by switching the tap material is then permitted to flow from another of said barrels into the sprue and which may be switched to prevent any material flowing into the sprue.

7. An injection moulding machine according to claim 5 in which there are only two separate screw-injection barrels.

8. An injection moulding machine according to claim 5 in which the barrels of the two injection moulding machines are aligned parallel to each other.

* * * * *